United States Patent [19]

Schirrmacher et al.

[11] Patent Number: 4,615,993

[45] Date of Patent: Oct. 7, 1986

[54] METHOD AND DEVICE FOR CARRYING OUT GAS/SOLID REACTIONS PARTICULARLY THE ACTIVATION AND RE-ACTIVATION OF ACTIVATED CARBON

[75] Inventors: Rüdiger Schirrmacher, Hanau; Gisbert Semmerau, Reichelsheim, both of Fed. Rep. of Germany

[73] Assignee: Degussa Aktiengesellschaft, Frankfurt, Fed. Rep. of Germany

[21] Appl. No.: 699,508

[22] Filed: Feb. 11, 1985

Related U.S. Application Data

[63] Continuation of Ser. No. 431,882, Sep. 30, 1982, abandoned.

[30] Foreign Application Priority Data

Oct. 8, 1981 [DE] Fed. Rep. of Germany ....... 3139926
Oct. 22, 1981 [DE] Fed. Rep. of Germany ....... 3141906

[51] Int. Cl.[4] ........................................... B01J 38/06
[52] U.S. Cl. ........................................ 502/55; 502/34; 502/431; 502/435

[58] Field of Search ............... 502/38, 41, 45, 47, 502/51, 430, 431, 433, 430

[56] References Cited

U.S. PATENT DOCUMENTS 3,161,483 12/1964 Morris ................................ 34/57 A
3,904,549 9/1975 Barton et al. ......................... 502/40
4,107,084 8/1978 Repik et al. ........................ 502/433

*Primary Examiner*—Andrew H. Metz
*Assistant Examiner*—Anthony McFarlane
*Attorney, Agent, or Firm*—Beveridge, DeGrandi & Weilacher

[57] ABSTRACT

Untreated coal is activated with steam at temperatures of 600° to 950° C. in a vibrating fluid bed, which is directly heated. The untreated coal is pre-dried by counter-current passage of the waste gases from the reaction either during feeding of the untreated coal or in the first part of the vibrating fluid bed trough. During the activation, secondary air can be passed in through a sparge pipe which is arranged parallel to the vibrating fluid bed trough. It is possible to carry out the heating exclusively with the supply of secondary air.

1 Claim, 5 Drawing Figures

METHOD AND DEVICE FOR CARRYING OUT GAS/SOLID REACTIONS PARTICULARLY THE ACTIVATION AND RE-ACTIVATION OF ACTIVATED CARBON

REFERENCE TO A RELATED APPLICATION

This application is a continuation of our copending application Ser. No. 431,882 filed Sept. 30, 1982, now abandoned, and which is relied on and incorporated by reference.

It is known how to activate carbon-containing raw materials. Different furnace types are used for this, but of these only the following three have attained general importance:
 directly heated rotary furnace
 the multiple hearth furnace and
 the fluid bed furnace The directly heated rotary furnace, which, because of its ruggedness, was very early on established for other high temperature processes, is probably the first large scale activation plant and that used most frequently. The transport of the carbonization material as well as transport of the energy takes place via the surface of the carbon bed in contact with the gas body, while the removal of the reaction gases must take place over the same cross-section.

The surface is thus the size-determining factor of the rotary furnace technology, which can be influenced within certain limits by promoting the surface renewal (eg. by increasing the rate of rotation and by provision of flights). (Cf. H. Helmrich et al., Chem. Ing.. Techn. 51 (1979), 8, 771; J. K. Brimacombe et al, Metallurgical Transactions 9B, (1978), 201).

The multiple hearth furnace has only very recently been used for the production and re-activation of activated carbons (U.S. Pat. No. 3,994,829). It consists of a vertical, lined cylindrical housing, which is divided into separate hearths by lined trays.

The carbon entering from above is transported in turn from inside to outside and vice versa over the trays and falls through holes onto the tray below. The horizontal transport of carbon is accomplished by means of plough blades fixed to rotating arms. This also produces a certain surface renewal. The activating gases, heated to a high temperature, are introduced at the bottom and pass from hearth to hearth counter-currently to the carbon. Each hearth can be heated by additional burners and/or additional steam or secondary air can be introduced.

The complicated mechanical arrangement of this multiple hearth furnace is at a disadvantage.

If it is desired to increase the exchange surface between carbon and reaction gas, it is possible to permit gas to flow through the bed of carbon. This can be done in a fixed bed or a fluid bed.

The well known cylindrical fluid bed furnace, however, is not suitable for the activation of carbon, since it has an unfavorable residence time spectrum. It processes where as high a throughput as possible is important (eg. coal carbonization, waste combustion) the residence time behavior of the individual particle is not material. However, the activation process is a partial carbonization process, in which it is important (in order to achieve a homogeneous product) that each individual carbon particle is as far as possible exposed to the same activation conditions (temperature, residence time and $H_2O$ partial pressure). Uniform temperature distribution and good equalization of partial pressure because of the intensive mixing are the main features of the fluid bed. The irregular back mixing in the cylindrical fluid bed, however, has the consequence that only about 65% of the solid is discharged after the mean residence time, while 10% of the solid remains in the fluid bed for at least three times the residence time (Cf. H. Jüntgen et al., Chem. Ing. Techn. 49 (1977) 2, MS447/77). Residence times of varying lengths, however, cause different degrees of combustion of the individual particles and thus an extension of the quality spectrum.

The decisive influence of the residence time spectrum in the activation of carbon in the fluid bed can be seen from the fact that a 15-stage circular reactor is known for this purpose (J. Klein, Chem. Ing. Techn. 51 (1979) 4. MS680/79).

Various solutions have been proposed to avoid uncontrolled back mixing, eg. dividing the reactor into several individual fluid beds, which are connected as cascades next to one another and located in a common furnace.

Another solution is known from U.S. Pat. No. 3,976,597. Here the fluid bed if in the form of a rectangular trough in which the fluidized carbon—if possible in plug flow—moves from the inlet to the outlet side.

The transport is accomplished by displacement of the material in the bed by the volume of carbon fed in. The division of the trough into two or into several individual troughs has the purpose of narrowing the residence time spectrum even further.

The BV Fluid Bed Reactor (U.S. Pat. No. 4,058,374) represents a further development of this method. Here the individual troughs are arranged not next to one another but above one another, the fluidizing gas flowing through the individual fluid beds in turn. Inside the individual troughs back-mixing is to be prevented by baffles, which are immersed into the bed from above.

The disadvantage of this fluid bed technology is that the fluidizing gas on the one hand serves as reaction gas, but on the other hand has to carry the heat required for the endothermic carbonization reaction. Therefore only combustion gases can be used as a fluid medium, the temperature of which, corresponding to the heat requirement of the reaction, is higher than the activation temperatures in question. Also, the use of combustion gases as fluidizing gas means that water vapor partial pressures of at most 0.3 to 0.4 bars can be attained. To maintain the suspended state in the fluid bed a clearly defined minimum fluidization velocity is required, which is a function of the gas density (which changes with the temperature), the coal bulk density (which decreases during the course of the activation) and the coal particle diameter.

It may be gathered from the mutual dependence of the individual factors that an optimal setting is not simple with this fluid bed technology.

A further fluid bed reactor is known from German Offenlegungsschrift No. 2,615,437.

In this reactor, the harmful back-mixing effect is to be avoided by a greater height/diameter ratio and by feeding the coal through a tube immersed down to the grate and withdrawing it at the surface of the fluid bed.

Heating takes place indirectly through the jacket of the reaction space and by pre-heating the steam. The system permits working with very high water vapor partial pressures, at least over the gas inflow tray. When the fluid bed is high, however, there is pronounced formation of large bubbles (bypass flow), so that one has to operate with a large excess of steam. Furthermore, the additional heat transfer resistence of the reactor wall due to the indirect heating requires correspondingly high external temperatures.

The object of the invention is a method for carrying out gas/solid reactions, particularly activation and re-activation of activated carbon, characterized in that the reaction is carried out in a vibrating fluid bed which is arranged in a horizontal reaction space.

The activation and re-activation of activated carbon can be carried out with steam or other oxidizing gases, such as carbon dioxide, air, inter alia. The activating gases can be heated in a heat exchanger to temperatures between 400° and 800° C. with the waste gases from the reaction.

According to the invention, the activation can be carried out in the following temperature ranges:

| Steam temperature: | 600° to 800° C. |
|---|---|
| Fluid bed temperature: | 600° to 950° C. |
| Temperature of the gas body: | 950° to 1200° C. |

The heating of the reaction space can be carried out directly. Thus, heating gases of this type can flow either counter-currently or co-currently to the flow of the untreated coal.

These heating gases can be produced, for example, by the combustion of a propane/air mixture. Other heating gases or liquid fuels, eg. heating oil or tar, can be used.

The flow of the waste gases from the activation reaction can be arranged in such a way that the untreated carbon is pre-treated with these gases.

This pre-treatment of the untreated carbon, in which the latter is subjected to drying, low temperature carbonization and/or pre-oxidation, can take place while the coal is being fed on to the vibrating fluid bed trough.

Feeding of the untreated carbon can then take place in such a way that it is conveyed by means of a metering device, for example, a metering screw, into a funnel. The waste gases from the reaction then flow around the funnel.

In an embodiment, it is possible to meter the untreated carbon by means of a vibrating trough, which can possibly be arranged in the reaction waste gas channel.

In a further embodiment, a drying of the untreated carbon can take place after feeding onto the vibrating fluid bed trough, the space underneath the gas inflow tray being divided and the reaction waste gases being fed at least partially into the first part and passed through the untreated carbon.

During the activation, secondary air can additionally be introduced into the reaction space through one or more sparge pipes, which are arranged parallel to the vibrating fluid bed trough and which have a considerable number of holes.

When the reaction has progressed, it is possible to carry out the heating exclusively by the addition of secondary air.

The secondary air can be pre-heated to temperatures between 200° and 500° C. in a heat exchanger with the reaction waste gases.

A further subject of the invention is a device for carrying out the method according to the invention, which device is characterized by a vibrating fluid bed trough 1 being arranged in a double jacket 3.

The inner jacket 3a—insulated on the outside—includes the body of burning gas and serves mainly to reflect the heat radiation. Since it is loaded with respect to temperature (max. 1200° C.) up to the upper limit for metallic materials, care is taken that it is not subjected to any mechanical loading. The outer jacket 3b—for which the inner jacket provides the radiation protection—takes up all the static loading and also serves to seal the interior of the furnace against the outer atmosphere.

The feeding device for the untreated carbon can be arranged in the reaction waste gas channel.

Within the double jacket 3, a secondary air sparge pipe 16 can be arranged parallel to the vibrating fluid bed trough 1 driven by vibrator 2.

The vibrating fluid bed trough can have two separate gas inlet openings and a dividing wall 18.

The method according to the invention and the device according to the invention have, in particular, the following advantages:

The approximate plug flow of the reaction material avoids the non-uniform back mixing, which results in a narrow residence time spectrum.

The cross flow of the fluidizing gases ensures high water vapor partial pressures in the carbon bed and rapid removal of the inhibiting product gases such as hydrogen and carbon monoxide.

BRIEF DESCRIPTION OF THE DRAWINGS

The device according to the invention is further illustrated by the drawings wherein.

Figure 1:
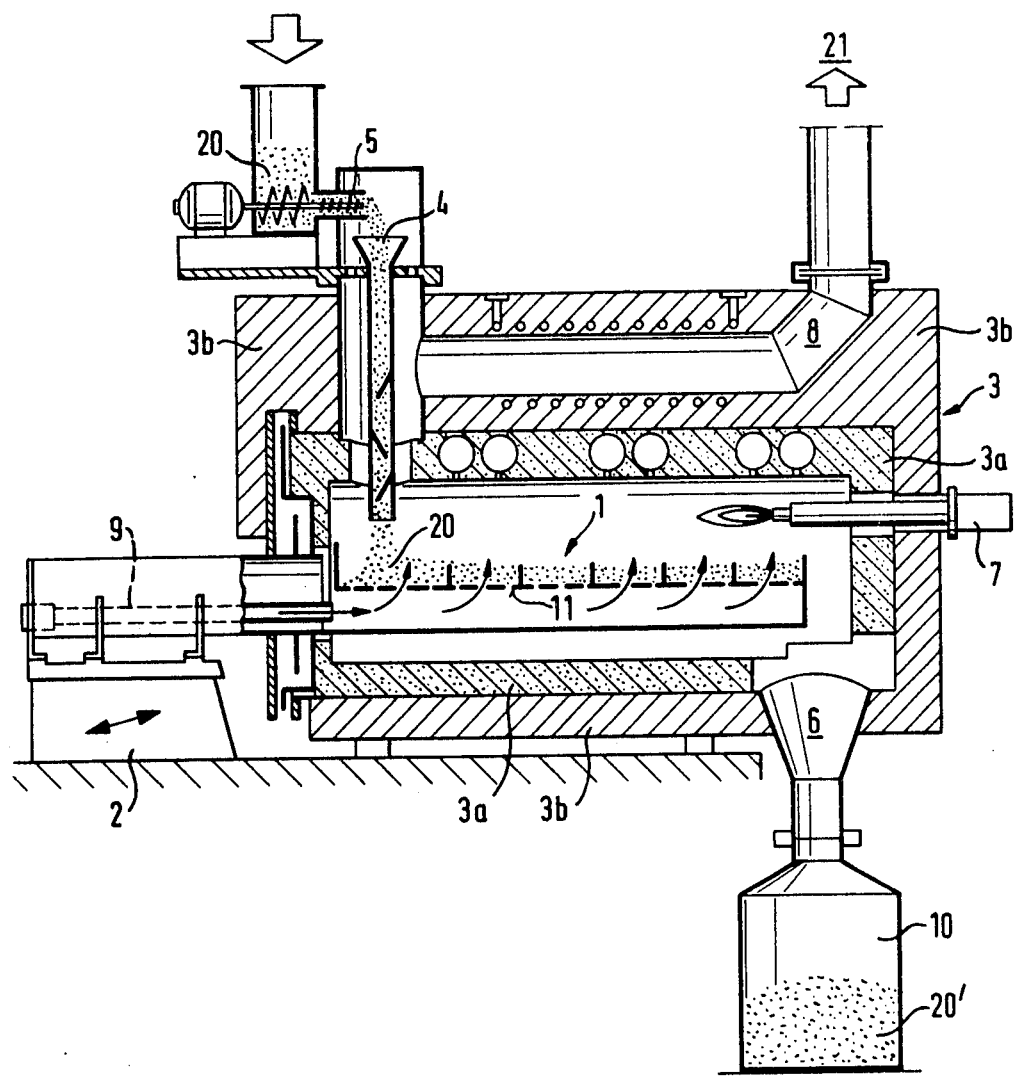
FIG. 1 shows the device according to the invention in longitudinal section.

According to FIG. 1, the device according to the invention includes the vibrating fluid bed trough 1, the vibration drive 2 for the vibrating fluid bed trough 1, the double jacket 3 which surrounds the vibrating fluid bed trough 1, the untreated carbon feed 4 which is fed by the metering screw 5, the product discharge opening 6 in the double jacket 3, the burner 7, the waste gas opening 8 and the steam supply device 9.

The untreated carbon 20 is fed into the funnel-shaped untreated carbon feed 4 by means of the metering screw 5, the carbon thus falling on to the vibrating fluid bed trough 1. The reaction waste gases 21 pass counter-current along the untreated coal feed 4 to the waste gas opening 8. The activated carbon 20' falls via the product discharge opening 6 into the storage container 10. The steam necessary for the reaction is introduced via the steam supply device 9 into the vibrating fluid bed trough 1 below the untreated coal 20 through the inflow tray 11 through the reacting material.

Figure 2:
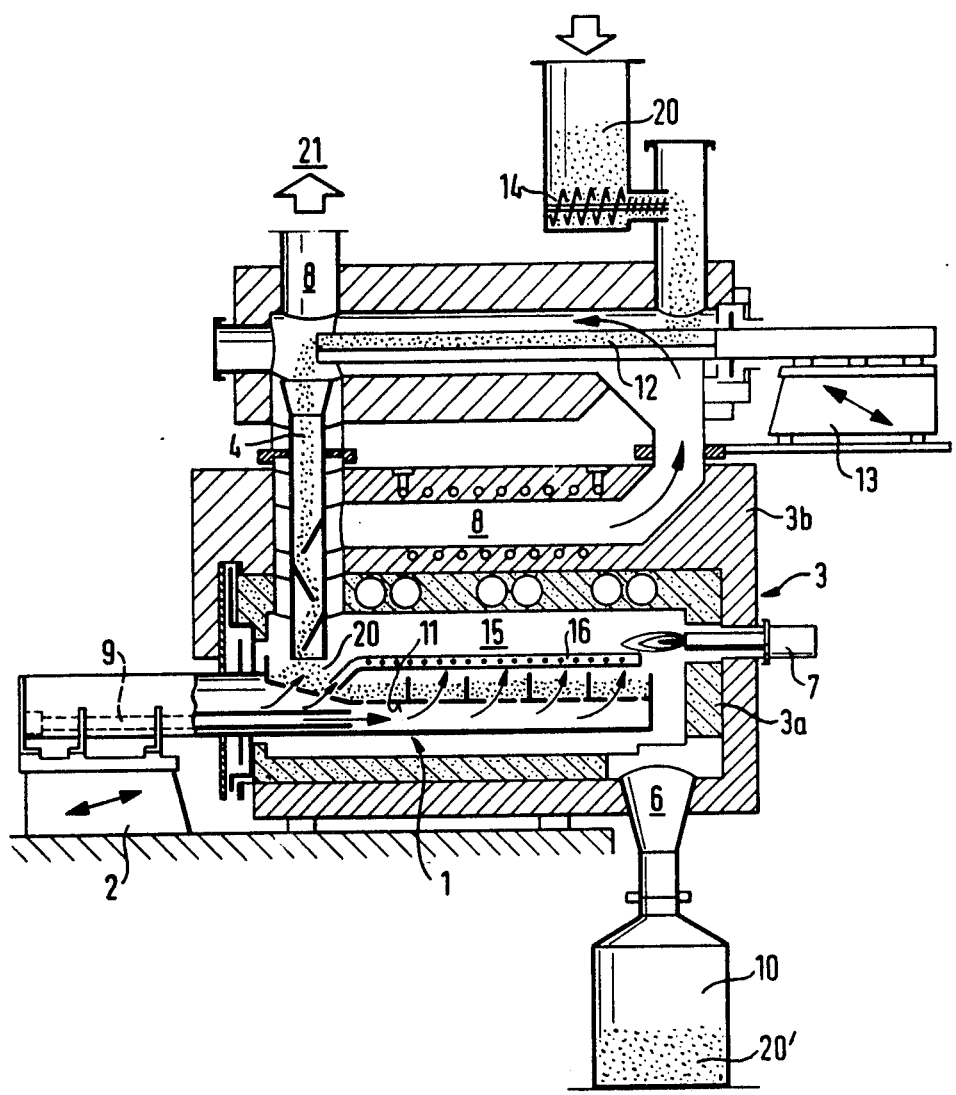
FIG. 2 shows an arrangement of the device according to the invention in longitudinal section with a carbon pre-drier.

In accordance with FIG. 2, the untreated carbon 20 is metered into the untreated carbon feed 4 by means of a vibrating trough 12. This vibrating trough 12 is driven by means of the motor 13 and is arranged in such a way that the untreated carbon is pre-heated by the reaction waste gases during the transport on the vibrating trough 12. The untreated carbon is fed on to the vibrating trough 12 by means of the metering screw 14.

Additionally, the secondary air sparge pipe 16 is arranged in the reaction spaces 15 parallel to the vibrating fluid bed trough 1.

Figure 3:
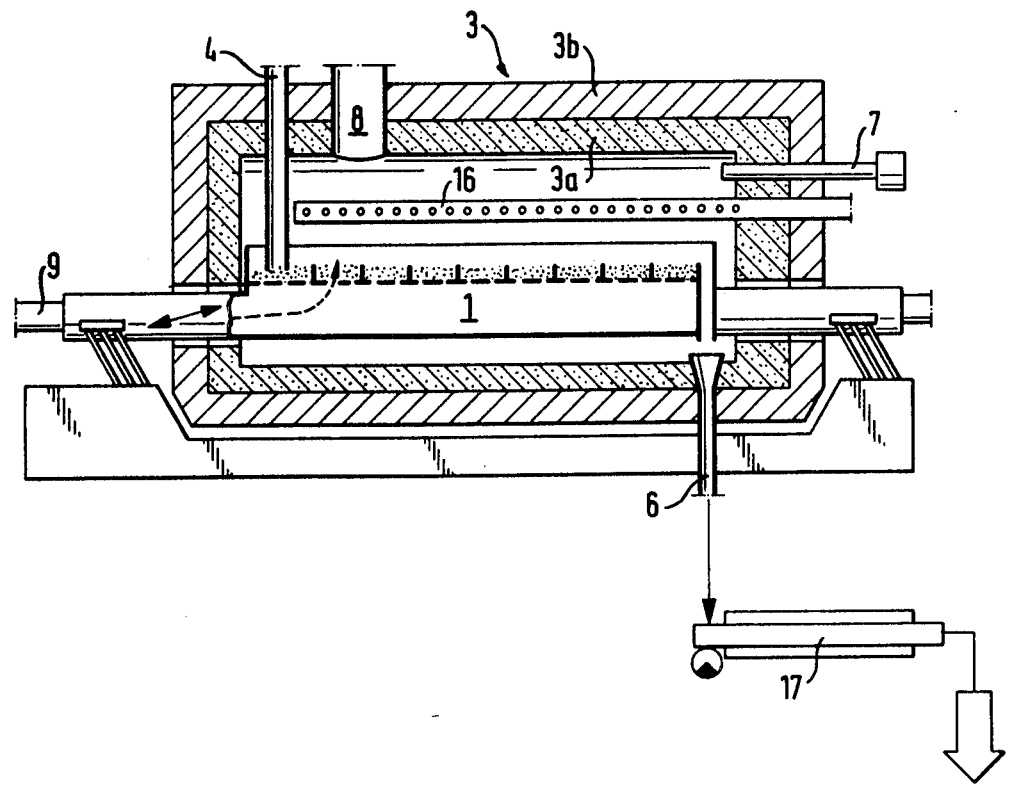
FIG. 3 shows an arrangement of the device according to the invention with built-in secondary air sparge pipe, in longitudinal section.

In accordance with FIG. 3, the secondary air sparge pipe 16 is arranged against the untreated carbon flow in the vibrating fluid bed trough 1, so that the added air flows counter-currently to the reacting material. By means of the untreated carbon feeding device 4, the untreated carbon is fed directly into the vibrating fluid bed trough 1. The discharge of the activated carbon takes place in the vibrating spiral cooler 17, where the reaction material is cooled to below the reaction temperature.

Figure 4:
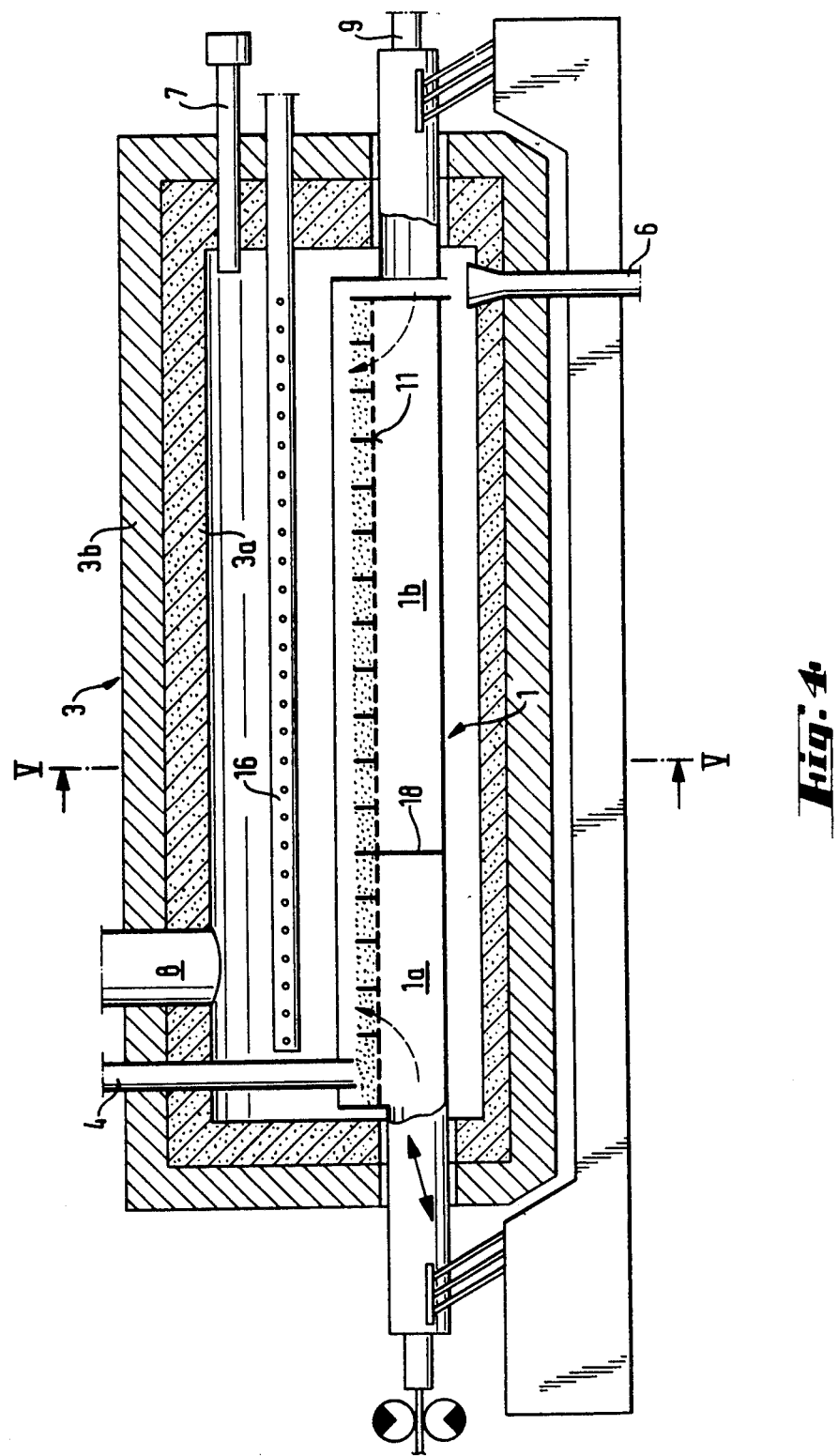
FIG. 4 shows an arrangment of the device according to the invention with built-in secondary air sparge pipe and carbon drier in the vibrating bed, in longitudinal section.

According to FIG. 4, the vibrating fluid bed trough 1 is divided into two parts by the wall 18. In part 1a, the reaction waste gas passes through the inflow tray 11 into the untreated carbon, thus drying it. In part 1b of the vibrating fluid bed, trough 1 steam is added.

Figure 5:
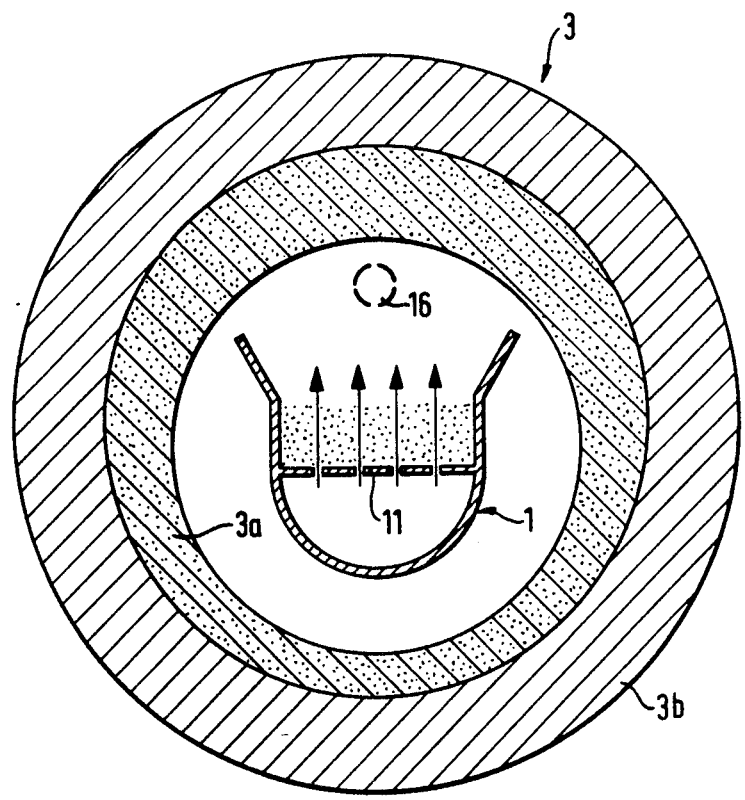
FIG. 5 shows the device according to the invention in cross-section.

In accordance with FIG. 5, the vibrating fluid bed trough 1, provided with the inflow tray 11, is arranged centrally in the double jacket 3. The secondary air sparge pipe 16 is arranged parallel to the vibrating fluid bed trough 1 and above it.

The method according to the invention is further explained and described by means of the following examples.

We claim:

1. A method for carrying out gas/solid reactions for the activation and reactivation of activated carbon, comprising:
   conveying carbonaceous material to a first zone and directly contacting said carbonaceous material in said first zone with gas sufficient to subject said carbonaceous material to drying,
   thereafter conveying said carbonaceous material to a second zone which is a horiztonally vibrating fluidized bed maintained at a temperature of 600° to 950° C. by combustion gas which is at a temperature of 950° to 1200° C. and depositing said carbonaceous material onto said vibrating horizontal bed,
   directly contacting said carbonaceous material in said bed with an activating gas, said activating gas being introduced into said bed from beneath said bed, said activating gas comprising steam, at a temperature of 600° to 900° C., passing the activating gas up through said carbonaceous material to thereby fluidize said bed while said material is being vibrated in a horizontal manner to thereby approximate plug flow of said material, the composition of said combustion gas and said activating gas being different,
   there being cross flow of the fluidizing gases to ensure high water vapor partial pressure in the bed of carbonaceous material and rapid removal of inhibiting product gases.

* * * * *

| | Example Raw Material Method | | 1 Lignite Coke Activation | | 2 | | 3 Reactivation[1] | |
|---|---|---|---|---|---|---|---|---|
| Coal Feed | kg/h | | 16 | | 12 | | 11 | |
| Coal Discharge | kg/h | | 7.2 | | 5.2 | | 7.8 | |
| Combustion | % | | 55 | | 57 | | 31 | |
| Carbonization Performance | kgC/m²/h[6] | | 42 | | 39 | | 18 | |
| Heating Gas Flow Rate (Propane) | $m_n^3$/h | $m_n^3$/kgC | 0 | 0 | 0 | 0 | 0.6 | 0.2 |
| Primary Air Flow Rate | $m_n^3$/h | $m_n^3$/kgC | 10 | 1.1 | 7 | 1.0 | 15 | 4.7 |
| Secondary Air Flow Rate | $m_n^3$/h | $m_n^3$/kgC | 25 | 2.8 | 35 | 5.2 | 0 | 0 |
| Steam Flow Rate | kg/h | kg/kgC | 15 | 1.7 | 20 | 2.9 | 11 | 3.4 |
| Temperature °C. | | | | | | | | |
| Coal Bed 1 | | | 840 | | 710 | | 780 | |
| 2 | | | 760 | | 740 | | 800 | |
| 3 | | | 720 | | 770 | | 750 | |
| Gas Body 1 | | | 1,180 | | 1,010 | | 980 | |
| 2 | | | 1,120 | | 940 | | 970 | |
| 3 | | | 1,040 | | 980 | | 1,000 | |
| | | (2) | 1 | 2 | 1 | 2 | 1 | 2 |
| Benzene Charge[3] | p/po = 0.9 | g/100 g | 15.2 | 47.6 | 15.2 | 45.2 | 15.4 | 36.2 |
| | p/po = 0.1 | g/100 h | not calc. | 17.7 | not calc. | 17.2 | not calc. | not calc. |
| Methylene Blue number[4] | | ml/0.1 g | 3.5 | 14.5 | 3.5 | 13.5 | 3.0 | 8.5 |
| Molasses Number[5] | | mg | ∼1,500 | 200 | ∼1,500 | 270 | ∼1,600 | 480 |

[1]Reactivation of charged lignite coke which had been used for water purification.
[2]1 = Starting material, 2 = Product; not calc. = not calculated.
[3]Benzene charge is the amount of benzene which the carbon can absorb at 20° C. and a defined benzene partial pressure (p/po).
[4]Determination according to DAB 6.
[5]Molasses number: The amount of carbon in mg, which under standard conditions achieves the same amount of coloration as a defined standard activated carbon.
[6]The amount of carbon carbonized per hour, related to the fluid bed surface.